INVENTOR.
Heino Kase
BY
Attorneys

United States Patent Office 3,618,402
Patented Nov. 9, 1971

3,618,402
SENSING MECHANISM FOR LINEAR SERVO ACCELEROMETER
Heino Kase, Walnut Creek, Calif., assignor to Systron-Donner Corporation, Concord, Calif.
Continuation of application Ser. No. 559,166, June 21, 1966. This application Sept. 23, 1969, Ser. No. 861,227
Int. Cl. G01p *15/08*
U.S. Cl. 73—517                                     2 Claims

ABSTRACT OF THE DISCLOSURE

Sensing mechanism for linear servo accelerometer having a body with a surface and with a magnet and a yoke mounted on the surface to form an air gap of a substantially constant width between the magnet and the yoke through which magnetic lines of flux pass. A force coil is disposed in the air gap and is in the form of a closed loop lying in a plane with an opening extending therethrough in a direction perpendicular to the plane. Means is provided exterior of the maget for pivotally mounting the force coil about an axis lying in the plane in the coil. The magnet extends through the opening in the coil and has a substantially planar surface which is generally parallel to and in relatively close proximity to the plane. A conducting non-magnetic element is secured to the force coil for movement with the force coil and a pickoff coil is mounted on the surface of the body for sensing the position of the conducting element. The sensing mechanism is very compact and small in size.

---

This application is a continuation of application Ser. No. 559,166 filed June 21, 1966 and now abandoned.

This invention relates to a sensing mechanism and more particularly to a sensing mechanism for a linear servo accelerometer.

In sensing assemblies heretofore available for linear servo accelerometers, it has been difficult to produce such a mechanism which is small in size and which does not adversely affect the capabilities of the sensing mechanism. There is, therefore, a need for a new and improved sensing mechanism for linear servo accelerometers.

In general, it is an object of the present invention to provide a sensing mechanism for a linear servo accelerometer which overcomes the above named disadvantages.

Another object of the invention is to provide a sensing mechanism of the above character which is very small in size.

Another object of the invention is to provide a sensing mechanism of the above character which can be either liquid damped or electrically damped.

Another object of the invention is to provide a sensing mechanism of the above character which has good environmental capabilities.

Another object of the invention is to provide a sensing mechanism of the above character which makes use of rectangular and planar geometry in order to obtain as large a magnet as possible in a small space.

Another object of the invention is to provide a sensing mechanism of the above character which has a very small stray magnetic field.

Another object of the invention is to provide a sensing mechanism of the above character which is well balanced.

Additional objects and features of the invention will appear from the following description in which the preferred embodiment is set forth in detail in conjunction with the accompanying drawings.

Referring to the drawings.

In general, the sensing mechanism consists of a body. Magnetic means including a magnet is mounted on the body for establishing a magnetic field. A force coil is provided. Means is also provided for mounting the force coil on the body so that the force coil is disposed in the magnetic field and permits pivotal movement of the same about an axis. A conductive non-magnetic element is secured to the force coil for movement with the froce coil. The magnetic means and the force coil are constructed so that they lie in a substantially common plane. A pickoff coil is mounted on the body for sensing the position of the movable conductive element carried by the force coil.

Figure 1:
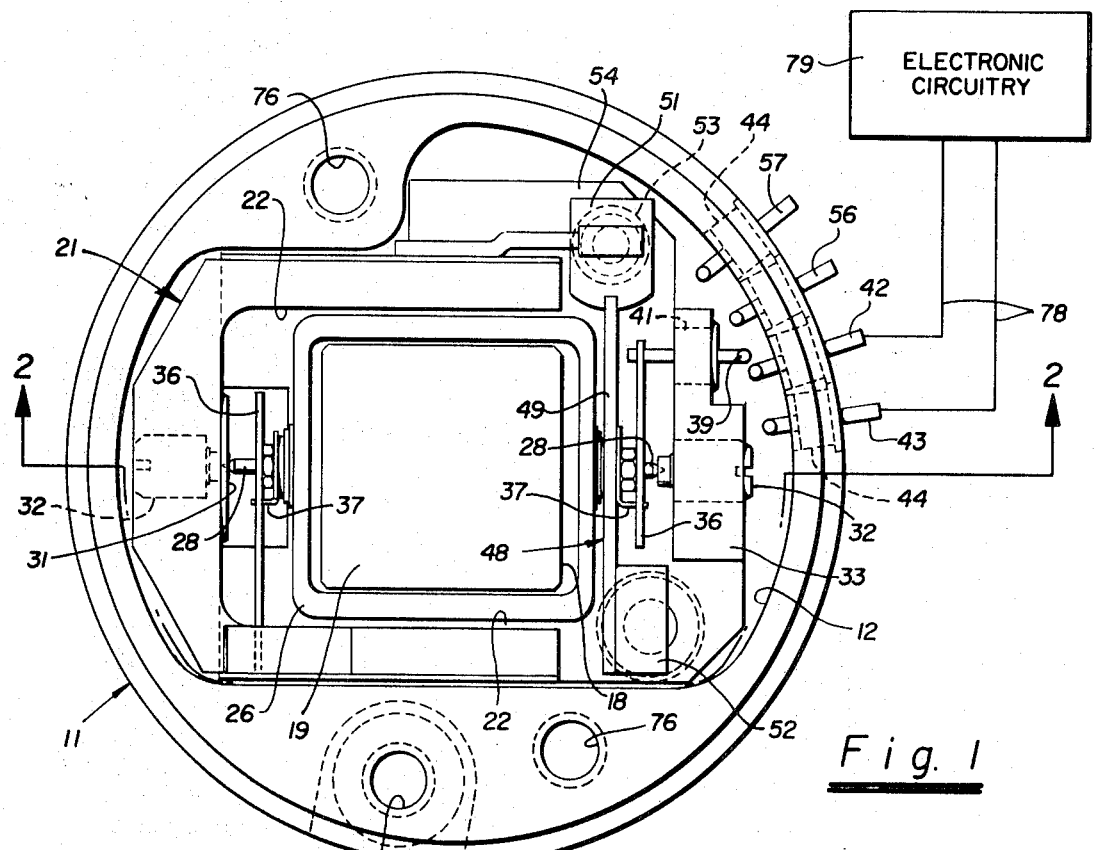
FIG. 1 is a cross-sectional view of a sensing mechanism for a linear servo accelerometer incorporating the present invention.
Figure 2:
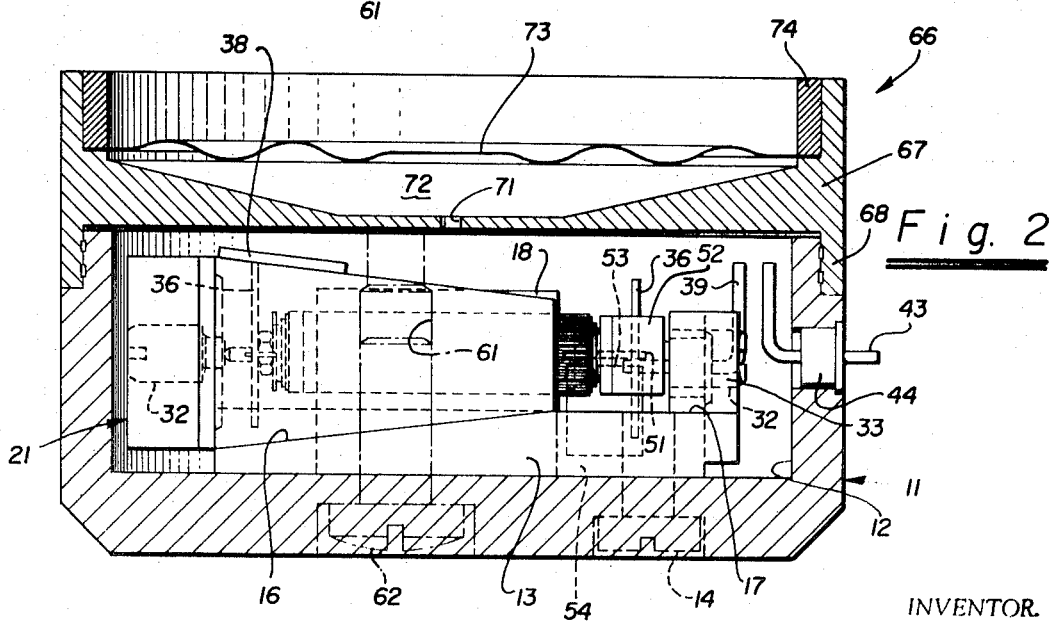
FIG. 2 is a cross-sectional view in side elevation of the sensing mechanism shown in FIG. 1 taken along the line 2—2 of FIG. 1.

More particularly as shown in the drawings, the sensing mechanism for a linear servo accelerometer consists of a body ore case 11 which is substantially cylindrical and which is provided with a recess 12 which open through one end of the body. A base member 13 is mounted within the recess and is secured to the body by screws 14. The base member 13 is provided with an inclined surface 16 and an adjoining horizontal surface 17. A rectangular magnet 18 formed of suitable material such as Alnico is mounted within the recess 12 of the body 11 on the planar surface 17 of the base 13. The magnet 18 is substantially square as shown and is provided with a planar surface 19. Means is provided for completing the magnetic path for the magnet 18 and consists of a U-shaped yoke 21 formed of soft iron which is mounted upon the base 13 within the recess 12 of the body 11. As can be seen from FIG. 1, the yoke 21 substantially encircles both sides of the magnet 18 to provide an air gap 22 on three sides of the magnet through which the lines of magnetic flux pass. It can be seen that the yoke 21 and the magnet 18 are formed so that they lie in a substantially common plane.

A force or restoring coil 26 is provided. In order to minimize the weight and the polar moment of inertia, the force coil is constructed from wire which is relatively light, as for example, aluminum. The force coil 26 also has a rectangular geometry so that it will fit within the air gap 22. Means is provided for mounting the force coil in the body so that it is disposed in the air gap 22 and consists of a pair of pivot and jewel assemblies. Each of the pivot and jewel assemblies consists of a pivot pin 28 which is affixed to one side of the force coil 26. An adjustable threaded jewelled screw 32 is provided for each pivot pin. One of the jewelled screws is threaded into the base of the yoke 21, whereas the other jewelled screw 32 is threaded into a block 33 mounted upon the base 13. Thus, it can be seen that the pivot and jewel assemblies permit pivotal movement of the force coil 26 about an axis which lies in a plane parallel to the plane of the surface 19 of the magnet 18 and parallel to the arms of the U-shaped yoke 21.

Means is provided for making electrical connections to the force coil 26 and consists of hair springs 36 associated with the pivot and jewel bearing assemblies. One end of each of the hair springs is connected to a conductor 37 which is connected to one end of the force coil 26. The other end of one of the hair springs 36 is connected to an insulated terminal 38, whereas the other end of the other hair spring 36 is connected to a feed-through terminal 39 mounted in the block 33. The terminals 38 and 39 are connected by wires (not shown) to feed through terminals 42 and 43 mounted in the body 11. An electrostatic shield 31 is located between hair spring 36 and yoke 21.

A paddle assembly 48 is affixed to the force restoring coil 26 and moves with the force restoring coil. It includes an arm 49 which is substantially planar as shown and which is mounted on the coil so that it is parallel to the side of the force coil on which it is mounted. A conducting non-magnetic element or paddle 51 is mounted on one end of the arm and extends in a direction at right angles to the arm 49. Means is provide for sensing the position of the paddle 51 and consists of a pick-off coil 53 of the type disclosed in U.S. Pat. 3,074,279. The pick-off coil 53 is mounted upon a pick-off block 54 which is mounted upon the base 13. The pick-off coil 53 is connected by wires (not shown) to feed through terminals 56 and 57 mounted in the body 11.

The body 11 is provided with an oil filling hole 61 which is normally closed by a screw 62. A cover assembly 66 is mounted upon the body 11 and forms a closure for the open end of the body 11. The cover assembly consists of a cover plate 67 which is provided with a downwardly extending flange 68 which fits over the upper portion of the body or case 11. The cover plate 67 is provided with a hole 71 to permit oil to pass into an expansion chamber 72 formed between a flexible diaphragm 73 and the cover plate 67. The flexible diaphragm 73 is held in place by a retaining ring 74.

The body or case 11 is also provided with holes 76 to permit the sensing mechanism to be mounted in an appropriate manner. The terminals 42, 43, 56 and 57 are connected by conductors 78 to suitable electronics 79. The electronics 79 can be of the type described in U.S. Pat. 3,074,279.

Operation and use of the sensing mechansim in a linear servo accelerometer may now be briefly described as follows. The accelerometer is normally positioned in such a manner that it can sense linear acceleration along its sensitive axis which is an axis perpendicular to the plane formed by the paddle or conducting element 51. With a change in acceleration, the paddle 51 will move toward or away from the pick-off coil 53, causing a change in the output of the oscillator provided in the electronic circuitry 79. The change in oscillator signal is amplified and the output current of the electronic circuitry fed back to the force coil 26 to reduce or increase the restoring force. The flow of current through the force coil in the magnetic field, created by the magnet 18, establishes a restoring force which is equal to the force which is applied to the paddle assembly 48 by the acceleration.

It has been found that the present sensing mechanism has excellent environmental capabilities even though it can be constructed so that it is very small in size. Rectangular geometry has been utilized for the force coil and the magnet and the air gap in order to make it possible to use as large a magnet as possible in the least amount of space. With the design shown, it has been found that there is a very small stray magnetic field.

The principal advantage of the geometry utilized is that it makes it possible to provide a flat one-dimensional system with light-weight and high restoring torque. In other words, planar geometry is utilized to decrease the amount of space required for the sensing mechanism.

Since the moving parts, such as the force coil with the paddle assembly attached thereto, are substantially perfectly balanced, the seismic mass can be located in any desired position. As, for example, the mass 52 is located on the end of the arm 49. Due to the light weight of the moving parts, the sensing mechanism is capable of surviving high vibration levels and shocks. The planar geometry has reduced the sensitivity to spin and angular accelerations. One additional improvement is the reduced vibration rectification effect.

It will be noted that the yoke has been tapered as the arms extend outwardly from the base to reduce the weight of the yoke without reducing the magnetic flux density in the working air gaps.

It is apparent from the foregoing that there has been provided a new and improved sensing mechanism for linear accelerometers which is particularly adapted for use where very small sensing mechanisms are required.

I claim:

1. In a sensing mechanism for a linear servo accelerometer, a base member having a mounting surface, a magnet mounted on said mounting surface, a substantially U-shaped yoke mounted on said mounting surface in the vicinity of said magnet, said magnet and said yoke being formed to provide spaced parallel sidewalls which form an air gap of a substantially constant width through which magnetic lines of flux pass, a force coil disposed in the air gap and having the form of a closed loop lying in a plane generally parallel to said mounting surface, said force coil having an opening extending therethrough in a direction perpendicular to said plane, means exterior of the magnet and carried by said base member for mounting the force coil for pivotal movement about an axis lying in the plane of said coil and generally parallel to said mounting surface, said magnet extending through the opening in said force coil and having a substantially planar surface which is generally parallel to and in relatively close proximity to the plane of said coil, said magnet being rectangular in cross section in a plane parallel to the substantially planar surface of the magnet, a conducting non-magnetic element secured to said force coil for movement with said force coil and a pick-off coil mounted on said base member for sensing the position of the conducting non-magnetic element.

2. A sensing assembly as in claim 1 wherein said force coil is in the form of a four-sided rectangle and wherein said conducting non-magnetic element is secured to one side of the force coil to move therewith.

References Cited

UNITED STATES PATENTS 3,331,253　7/1967　Morris.
3,389,608　6/1968　Moskowitz _____ 73—517

RICHARD C. QUEISSER, Primary Examiner